(12) United States Patent
Herzog et al.

(10) Patent No.: US 8,375,134 B2
(45) Date of Patent: Feb. 12, 2013

(54) DETERMINING AN EFFICIENT KEEP-ALIVE INTERVAL FOR A NETWORK CONNECTION

(75) Inventors: Shai Herzog, Bellevue, WA (US);
Rashid Qureshi, Redmond, WA (US);
Jorge Raastroem, Sammamish, WA (US); Xuemei Bao, Redmond, WA (US);
Rajeev Bansal, Redmond, WA (US);
Qian Zhang, Bellevue, WA (US); Scott Michael Bragg, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 12/480,560

(22) Filed: Jun. 8, 2009

(65) Prior Publication Data

US 2010/0312899 A1    Dec. 9, 2010

(51) Int. Cl.
*G06F 15/16* (2006.01)
(52) U.S. Cl. ........ 709/228; 709/203; 709/224; 370/241; 370/251; 370/401; 370/465
(58) Field of Classification Search .................. 709/203, 709/228, 224
See application file for complete search history.

(56) References Cited

U.S. PATENT DOCUMENTS

| | | | |
|---|---|---|---|
| 7,152,111 B2 | 12/2006 | Allred et al. | |
| 7,236,781 B2 * | 6/2007 | Patil et al. | 455/432.1 |
| 7,426,569 B2 * | 9/2008 | Dunk | 709/232 |
| 7,460,556 B2 * | 12/2008 | Duggirala et al. | 370/465 |
| 7,568,040 B2 * | 7/2009 | Townsley et al. | 709/230 |
| 7,668,100 B2 * | 2/2010 | Balasaygun et al. | 370/235 |
| 7,675,916 B2 * | 3/2010 | Kempe | 370/395.21 |
| 7,693,084 B2 * | 4/2010 | Herzog | 370/251 |
| 7,729,273 B2 * | 6/2010 | Knapik et al. | 370/252 |
| 7,729,357 B2 * | 6/2010 | Strater et al. | 370/395.4 |
| 7,756,155 B2 * | 7/2010 | Duggirala et al. | 370/465 |
| 7,778,623 B2 * | 8/2010 | Araki et al. | 455/343.3 |
| 7,899,921 B2 * | 3/2011 | Hill et al. | 709/230 |
| 7,965,637 B1 * | 6/2011 | Trivedi et al. | 370/235 |
| 7,978,630 B2 * | 7/2011 | Bengtsson et al. | 370/254 |
| 8,194,636 B1 * | 6/2012 | Doherty et al. | 370/350 |
| 2006/0123119 A1 * | 6/2006 | Hill et al. | 709/227 |
| 2007/0112954 A1 | 5/2007 | Ramani et al. | |
| 2007/0140159 A1 | 6/2007 | Eronen et al. | |

(Continued)

OTHER PUBLICATIONS iGlance and Adaptive KeepAlives, David Barrett, May 10, 2009, pp. 1-3.*

(Continued)

*Primary Examiner* — Kamal Divecha
(74) *Attorney, Agent, or Firm* — Alleman Hall McCoy Russell & Tuttle LLP

(57) ABSTRACT

Systems and methods for use in communication between a client and a server, via a networking device, are provided. The method may include sending a request to establish a data connection from the client to the server via the networking device, setting a data connection keep-alive interval for the data connection to a predetermined safe value, and sending a request to establish a test connection between the client and the server. The method may further include determining an efficient keep-alive interval for communication between the client and server via the networking device, using the test connection, setting the data connection keep-alive interval to the efficient keep-alive interval determined using the test connection, and uploading the efficient keep-alive interval from the client to the server in an efficient keep-alive interval notification message, for communication to other clients connected to the server.

14 Claims, 4 Drawing Sheets

U.S. PATENT DOCUMENTS

| | | | |
|---|---|---|---|
| 2007/0214256 | A1 | 9/2007 | Castaneda et al. |
| 2007/0233815 | A1* | 10/2007 | Lu et al. ............ 709/219 |
| 2008/0165796 | A1 | 7/2008 | Martinez et al. |
| 2008/0205288 | A1 | 8/2008 | Herzog |
| 2008/0225865 | A1 | 9/2008 | Herzog |
| 2009/0154474 | A1* | 6/2009 | Arima et al. .......... 370/400 |
| 2009/0271517 | A1* | 10/2009 | Naylor et al. .......... 709/227 |

OTHER PUBLICATIONS

Adapting to NAT timeout values in P2P overlay networks, pp. 1-7.*
Still Alive: Extending Keep-Alive Intervals in P2P Overlay Networks, Richard Price, obtained from Internet on Dec. 21, 2011.*
Software Engineering, Design and implementation of emergent networks, David Barrett, May 11, 2009.*
"Douglis, et al", "Adaptive Modem Connection Lifetimes", retrieved at <<http://www.usenix.org/events/usenix99/full_papers/douglis/douglis_html/index.html>>, pp. 1-20.
"Wu, et al", "A Petri Net Approach to Analyze the Effect of Persistent Connection on the Scalability of Web Services", retrieved at <<http://ieeexplore.ieee.org/stamp/stamp.jsp?arnumber=04554422>>, pp. 1-4.
"Zheng, Rong", "Design, Analysis and Empirical Evalution of Power Management in Multi-Hop Wireless Networks", retrieved at <<http://www.csee.usf.edu/~christen/energy/pcg_dissertation.pdf>>, 2004. pp. 1-157.
"Web Server Scalability", retrieved at <<http://download.microsoft.com/download/7/4/f/74fe970d-4a7d-4034-9f5d-02572567e7f7/20_CHAPTER_7_Web_Server_Scalability.doc>>, pp. 1-53.

* cited by examiner

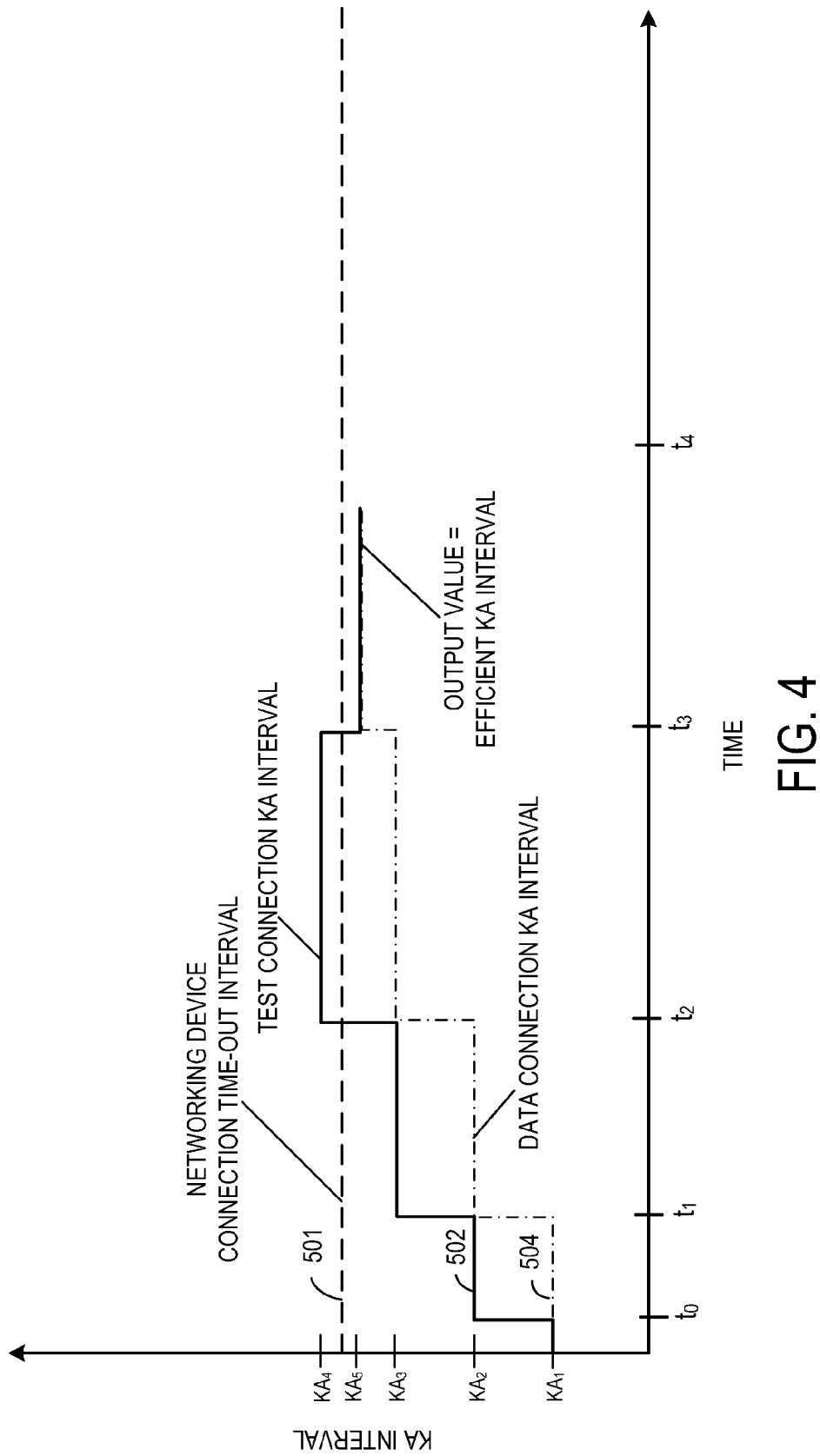

DETERMINING AN EFFICIENT KEEP-ALIVE INTERVAL FOR A NETWORK CONNECTION

BACKGROUND

Networking devices, such as network address translation (NAT) devices, firewall devices, etc., maintain state for each connection they serve. As a mechanism to cleanup connection state, the networking devices may time-out when a connection between a client and a server remains inactive for a predetermined period of time, causing the device to terminate service for this connection. To prevent the networking devices from timing out due to inactivity, a fixed keep-alive interval may be used. The fixed keep-alive interval may be shorter than most or all of the known time-out values corresponding to networking devices on the market. However, the variation in the time-out values of different types or differently configured networking devices may be substantial. Thus, when certain networking devices are utilized, there may be a large discrepancy between their individual time-out value and the lowest common denominator fixed keep-alive interval. This discrepancy may significantly impact the battery life of the client, due to the frequent and superfluous packets sent to and from the networking device. A significant amount of network traffic may also be generated when a fixed keep-alive interval is applied to a large number of clients, increasing network operating costs. Thus, a fixed keep-alive interval may have a negative impact on the computing system as a whole.

To decrease power consumption and increase networking efficiency within such a system the keep-alive interval may be increased to fit with individual time-out characteristics of different devices. One technique which may be used to increase the keep-alive interval involves establishing a connection between a client and a server via a networking device such as a NAT device, firewall, load balancer etc., and incrementally increasing the keep-alive interval until the networking device times out and drops the connection. Subsequent to the time-out, a preceding keep-alive interval which has not failed is used by the client, in an attempt to maintain a persistent connection and over time the process repeats itself with new attempts to increase the keep-alive interval.

However, using the longest keep-alive interval that has not failed in a test may result in inefficiencies and poor user experience since routine network failure may be incorrectly attributed to time-outs, and repeating the test periodically means a periodic break in the connection would be noticeable to the user. This may lead to periods of unneeded network traffic between the client and server, resulting in a poor user experience, poor battery performance, etc. These problems may be multiplied across thousands of users in the user base for a service provider to mobile clients.

SUMMARY

Systems and methods for use in communication between a client and a server, via a networking device, are provided. The method may include sending a request to establish a data connection from the client to the server via the networking device, setting a data connection keep-alive interval for the data connection to a predetermined safe value, and sending a request to establish a test connection between the client and the server. The method may further include determining an efficient keep-alive interval for communication between the client and server via the networking device, using the test connection, setting the data connection keep-alive interval to the efficient keep-alive interval determined using the test connection, and uploading the efficient keep-alive interval from the client to the server in an efficient keep-alive interval notification message, for communication to other clients connected to the server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates a graph of example keep-alive intervals for a data connection and a test connection, which have been determined according to the methods of FIGS. 2-3.

DETAILED DESCRIPTION

Figure 1:
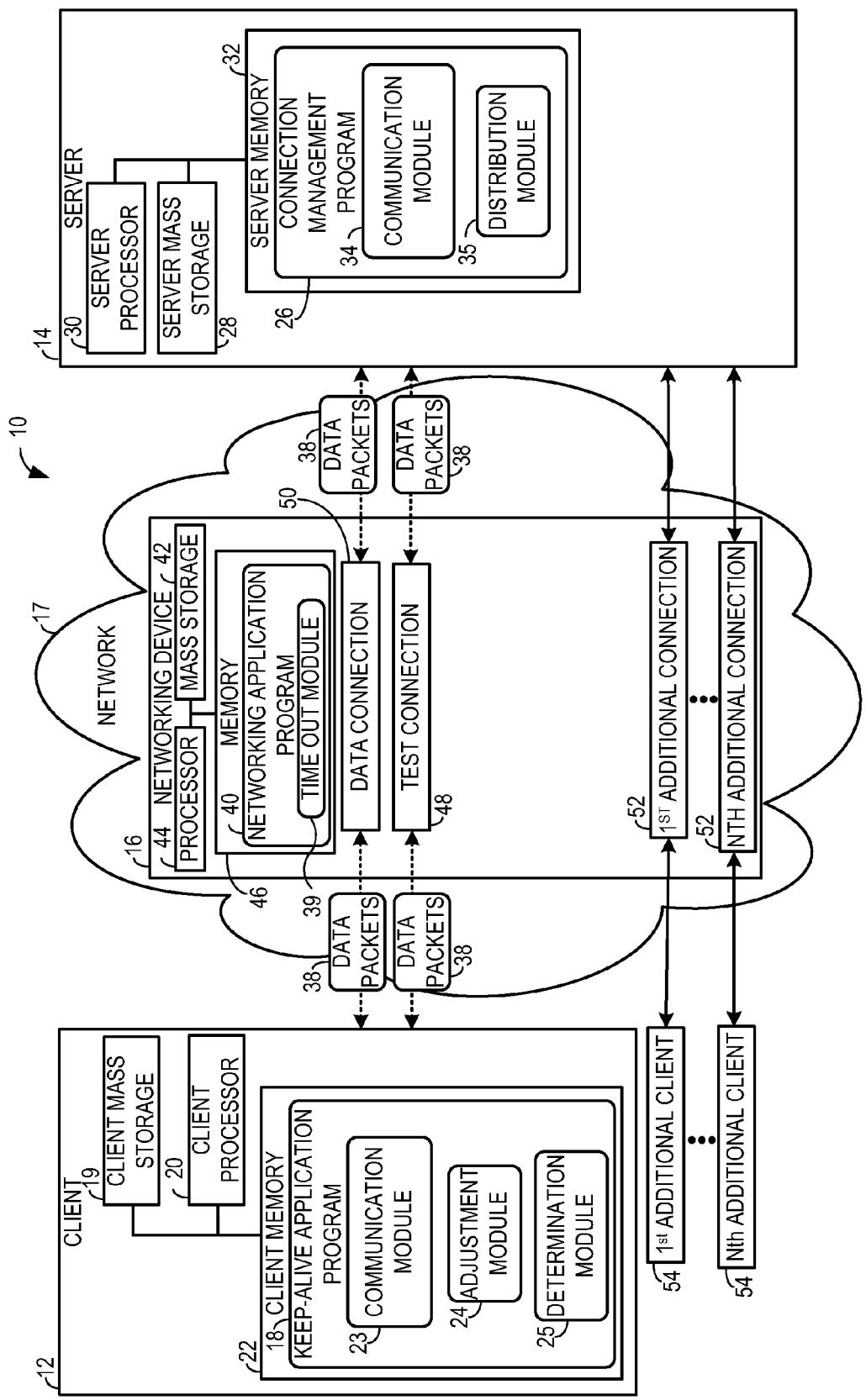
FIG. 1 is a schematic view of one embodiment of a computing system for managing communications between a client and a server, via a networking device.

FIG. 1 illustrates a schematic depiction of a computing system 10. The computing system 10 may include a client 12 and a server 14, which are configured to communicate over a network 17 via a networking device 16. The client 12 and server 14 may be configured to establish a test connection 48 and a data connection 50 using suitable communications protocols, such as transmission control protocol (TCP), persistent Hypertext Transfer Protocol (HTTP), etc. The test connection is used to programmatically test network device time-out and the data connection is used to exchange data between the client and server and to allow the client to distinguish between network time-out failure and other unrelated networking issues.

By programmatically testing the test connection 48 in the manner discussed herein, the client 12 may be configured to determine an efficient keep-alive interval that does not exceed a connection time out value of the networking device 16, without interrupting data transmission over the data connection 50. The client 12 may communicate via server 14 the efficient keep-alive interval to additional clients connected to networking devices 16 or related networking devices, so that those clients avoid redundant calculation of an efficient keep-alive interval on their own. Exemplary methods utilized to determine the efficient keep-alive interval, as well as the way in which the keep-alive interval is propagated throughout the network to other devices connected to the networking device 16, are discussed with more detail herein with regard to FIGS. 2-3.

It will be appreciated that client 12 may be a computing device such as a mobile phone, portable data assistant, laptop computer, personal media player, desktop computer, etc. As one example, the client 12 may be included in a private network having a plurality of additional clients, each of which connects to a public network via an access point including the networking device 16. In other embodiments, the client may be included in a public network.

The client 12 may include a keep-alive application program 18 stored on client-side mass storage 19 (e.g., hard drive, solid state memory, etc.) executable via a client-side processor 20 using portions of client-side memory 22. The keep-alive application program is configured to adjust the keep-alive interval for connections of the client, as described below. The keep-alive application program 18 may include a client-side communication module 23 configured to facilitate communication between the client 12 and the server 14 via the networking device 16. Additionally, the keep-alive application program 18 may include an adjustment module 24 that is configured to adjust a keep-alive interval on each connection of the client, and a determination module 25 that is configured to determine an efficient keep-alive interval based on the convergence of a test keep-alive interval and a data keep-alive interval. The detailed functions of the client-side communication module 23, the adjustment module 24, and the determination module 25 are discussed in more detail herein with regard to FIGS. 2-3. It will be appreciated that the client 12 may include additional application programs which may be executed via the client-side processor 20. For example, a browser application program, email application program, etc., may be executed on the client 12, and may communicate with server 14 using the data connection 50.

Turning now to the server 14, the server 14 may be a server or a server cluster, and may include a connection management program 26 stored on server-side mass storage 28 and executable via a server-side processor 30 using portions of server-side memory 32. The connection management program 26 may include a server-side communication module 34 configured to open and manage connections between the client and server via the network 17, and a distribution module 35 configured to distribute an efficient keep-alive interval determined from interactions with client 12 to other additional clients 54 connected to the same networking device 16, or another related networking device in the same cluster. The operations of the server-side communications module 34 and the distribution module 35 are discussed in more detail herein with regard to FIGS. 2-3.

Now turning to the networking device 16, the networking device may be configured to facilitate communication between the client 12 and the server 14. Exemplary networking devices 16 may include one or more of a network address translation (NAT) device, a firewall device, a load balancer, and a Gateway GPRS Support Node (GGSN) device, or other networking device. The networking device 16 may be configured to manage connections between the client and the server by allowing and disallowing connections, routing data packets along the connections, etc. Further, the networking device 16 may be configured to terminate a connection established between the client 12 and the server 14 via a time-out module 39, when the connection remains inactive for a predetermined period of time, referred to as a connection time-out value. The time-out module 39 may be included in a networking application program 40 stored on mass storage 42 executable via a processor 44 using portions of memory 46 of the networking device 16. It will be appreciated that, although a single networking device is depicted a plurality of networking devices (e.g. a cluster of related networking devices) may be utilized.

As discussed above, a test connection 48 and/or a data connection 50 may be established between the client 12 and the server 14 via the networking device 16. Typically, the test connection 48 and the data connection 50 are persistent TCP connections, which the client 12 is programmed to initiate with the server 14. Each persistent TCP connection is configured to carry data packets 38 from the client to the server and vice-versa, and has an associated keep-alive interval which represents the maximum quiet period on the connection before the client needs to generate a keep-alive packet (to maintain the data channel or test the test connection). It will be appreciated that in an alternative embodiment, the test and data connections may be set up according to another protocol, such as persistent HTTP.

The data connection 50 is typically used to carry data back and forth between the client 12 and server 14, and communicate control information. The test connection 48 is dedicated to testing network device time-outs and does not generally carry data. For example, data packets from a browser application program or email application program may be sent over the data connection to the server from the client, but not over the test connection.

Using the methods described below, the test connection 48 and data connection 50 may be used to determine an efficient keep-alive interval for the test connection 48 and data connection 50 with the client 12, which in turn may be applied to additional client connections 52 between server 14 and additional clients 54.

Figure 2:
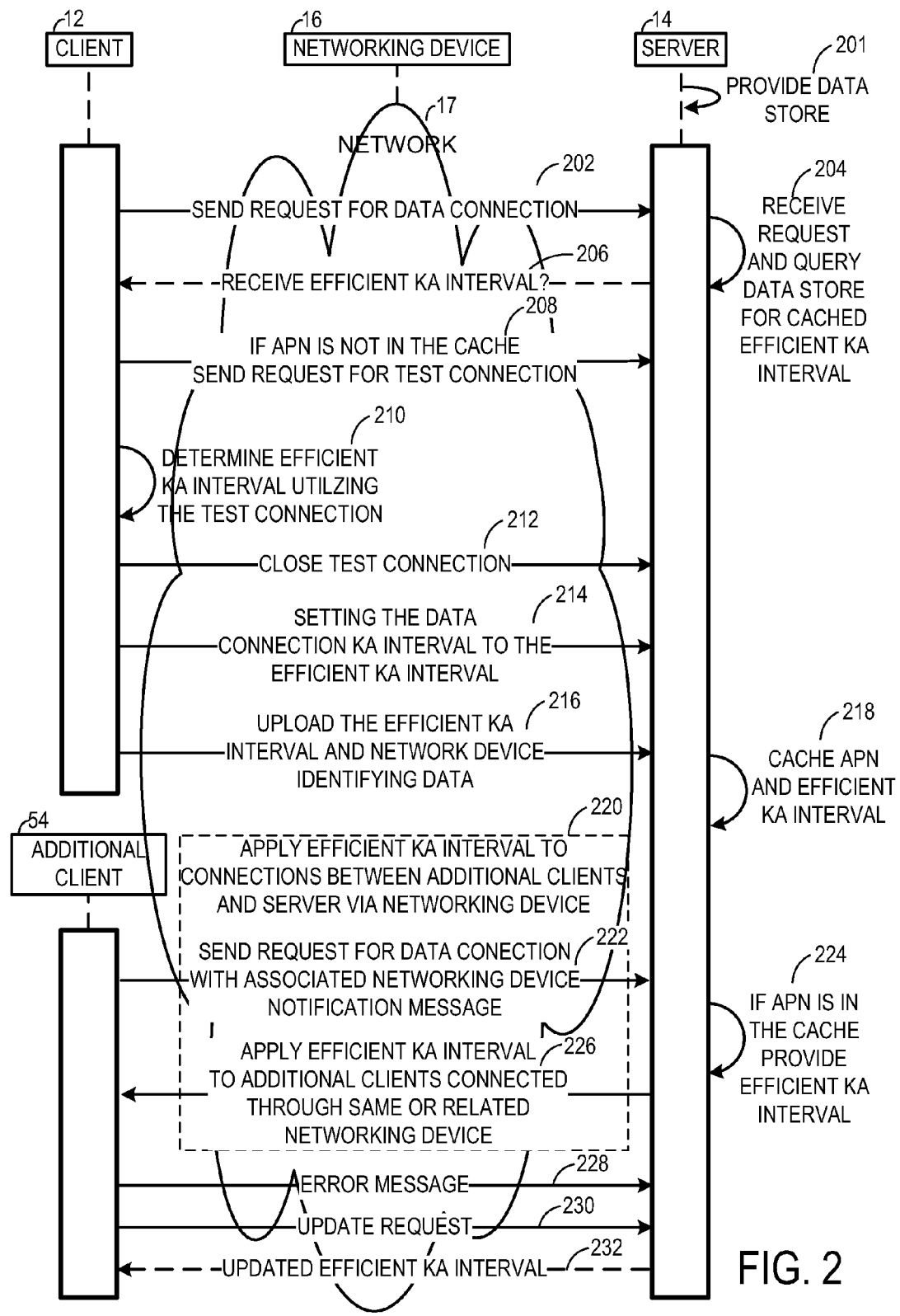
FIG. 2 is a flowchart of one embodiment of a method for managing communications between a client and a server, via a networking device.

FIG. 2 illustrates an embodiment of a method 200 for use in communication between a client and a server, via a networking device. It will be appreciated that method 200 may be implemented using the hardware and software components of system 10 described above, or by other suitable hardware components. At 201, in a preprocessing phase, the method may include, at the server, providing a data store configured to store efficient keep-alive intervals received from the plurality of clients via respective networking devices. It will be appreciated that step 201 may be performed by implementing the connection management program 26, illustrated in FIG. 1.

At 202, the method may include sending a request to establish a data connection from the client to the server via the networking device. The request may include classification information such as APN, DNS suffix and subnet of the requesting client, for use as discussed below. Step 204 may be performed by implementing the client-side communication module 23, illustrated in FIG. 1.

At 204, the method may include, at the server, receiving the request for a data connection from the requesting client, and querying the data store to determine if a matching cached efficient keep-alive interval is present in the data store, which has been received from another client connected to the same or a related networking device. After receiving the request, the method may further include, at the server, identifying from the request at least one of an APN, DNS suffix and subnet of the requesting client. Thus, querying the data store may include determining if an efficient keep-alive interval has been stored for the at least one of the APN, DNS suffix and subnet of the requesting client. If the cached efficient keep-alive interval is present, the method may include sending the cached efficient keep-alive interval from the server to the requesting client for application to the data connection. If no cached efficient keep-alive interval is present, the server will communicate this fact to the client. Step 204 may be performed by implementing the server-side communication module 34, illustrated FIG. 1.

At 206, the method may include determining whether a cached efficient keep-alive interval is received from the server. If the cached efficient keep-alive interval is received at the client from the server, then the method may include setting a data connection keep-alive interval for the data connection to the cached efficient keep-alive interval, and skipping the remaining steps below, apart from possible application of error detection and updating steps at 228-232.

Otherwise, if is determined at 206 that a cached efficient keep-alive interval is not received from the server, then the method may include setting a data connection keep-alive interval for the data connection to a predetermined safe value. As one example, the safe keep-alive interval may be set to a default value stored at the server and sent from the server to the client, for example, during establishment of the data connection. As another example, the safe value may be a predetermined value stored on the client. It will be appreciated that step 206 may be performed by implementing the client-side communication module 23, illustrated in FIG. 1.

At 208, the method may include sending a request to establish a test connection between the client and the server. Typically, the request is made if it is determined that the cached keep-alive interval is not in the data store. Step 208 may also be performed by implementing the client-side communication module 23 of FIG. 1.

At 210, the method may include determining an efficient keep-alive interval for communication between the client and server via the networking device, using the test connection. It will be appreciated that step 210 may be performed by implementing various modules included in the keep-alive program 18, illustrated in FIG. 1 and discussed in greater detail herein with regard to FIG. 3.

At 214, the method may include setting the data connection keep-alive interval to the efficient keep-alive interval determined using the test connection. It will be appreciated that step 214 may be performed by implementing the adjustment module 24, illustrate in FIG. 1.

At 216, the method may include uploading the efficient keep-alive interval from the client to the server in an efficient keep-alive interval notification message. In one example, the efficient keep-alive interval notification message includes network device identifying data including one or more of APN and DNS suffix, as well as the determined efficient keep-alive interval. Step 216 may be performed by implementing the client-side communication module 23 of FIG. 1.

At 218, the method may include, at the server, receiving an efficient keep-alive interval from the requesting client, and caching the efficient keep-alive interval in the data store for availability to other requesting clients. Step 218 may be performed by implementing the server-side communication module 34, illustrated in FIG. 1.

It will be appreciated that, as described above, client 12 may be one of a plurality of clients connected to the server 14 via the networking device 16, and the method may further include, as illustrated at 220, applying the efficient keep-alive interval to connections between additional clients included in the plurality of clients and the server via the networking device. Applying the efficient keep-alive interval may include, as shown at 222, from each of the additional clients, sending a request to initiate a respective data connection with the server, and an associated networking device notification message to identify to the server the networking device via which the additional client is connected to the server. At 224, the server may make a determination that the efficient keep-alive interval for the connections to the additional clients via the networking device has been uploaded and is stored at the server in the data store. In some examples, step 222 may be performed by implementing the client-side communication module 23 and step 224 may be performed by implementing the server-side communication module 34 and the distribution module 35 illustrated in FIG. 1. It will be appreciated that the networking device notification message includes APN and DNS suffix, and the server determination is based on the APN and DNS suffix and on a client subnet detectable from the data connection between the client and server. At 226, the method may include, in response to the server determination at 224, downloading the efficient keep-alive interval to each of the additional clients. It will be appreciated that step 226 may be performed by implementing the server-side communication module 34, illustrated in FIG. 1.

From time to time, a client may detect an error (connection drops) in a data connection established using an efficient keep-alive interval received from the server. In response, the client may open a new data connection to the server, and send a test message, to determine whether an acknowledgment is received. If no acknowledgment is received on the new data connection, the cause of the detected error may be attributed to network conditions, and the client may close the new connection and later attempt to establish the data connection using the same efficient keep-alive-interval. However, if an acknowledgment is received on the new connection, then the client may attribute the cause of the detected error to an erroneous efficient keep-alive interval, which exceeded the time-out of the networking device. At 228, the method may include sending an error message from at least one of the additional clients to the server, indicating that the efficient keep-alive interval downloaded from the server is resulting in a connection time-out on a data connection between the corresponding client and the server, which may be due to the networking device connection time-out interval being shorter than the efficient keep-alive interval currently being applied.

Upon confirming the detected error is not due to networking problems, the client may attempt to request an updated keep-alive interval from the server. Thus, at 230, the method may include, after sending the error message from the corresponding client, sending a request for an updated efficient keep-alive interval to the server from the corresponding client. And, at 232, the method may include receiving an updated efficient keep-alive interval at the corresponding client, which has been calculated at the server in response to the error message from the corresponding client. The client may check the updated keep-alive interval to determine whether it is less than the current keep-alive interval on the data connection on which errors were detected, and if so, the client may reestablish the data connection with the updated keep-alive interval. However, if the client determines that the server has sent an updated keep-alive interval that is equal to or greater than the current keep-alive interval on the data connection that has failed, then the client will determine a new keep-alive value using a test connection, as described at step 210 above. In some examples, steps 228-232 may be performed by implementing a communication module included in the corresponding client. The communication module may be similar to the client-side communication module 23, illustrated in FIG. 1. If no updated efficient keep-alive interval is received from the server, or if the server otherwise instructs the client to re-determine the interval, then the client may be configured to establish (or reestablish) a test connection with the server and re-determine the efficient keep-alive interval using the test connection, upon detecting a failure in the data connection at the efficient keep-alive interval, in the manner described herein with relation to step 210.

Figure 3:
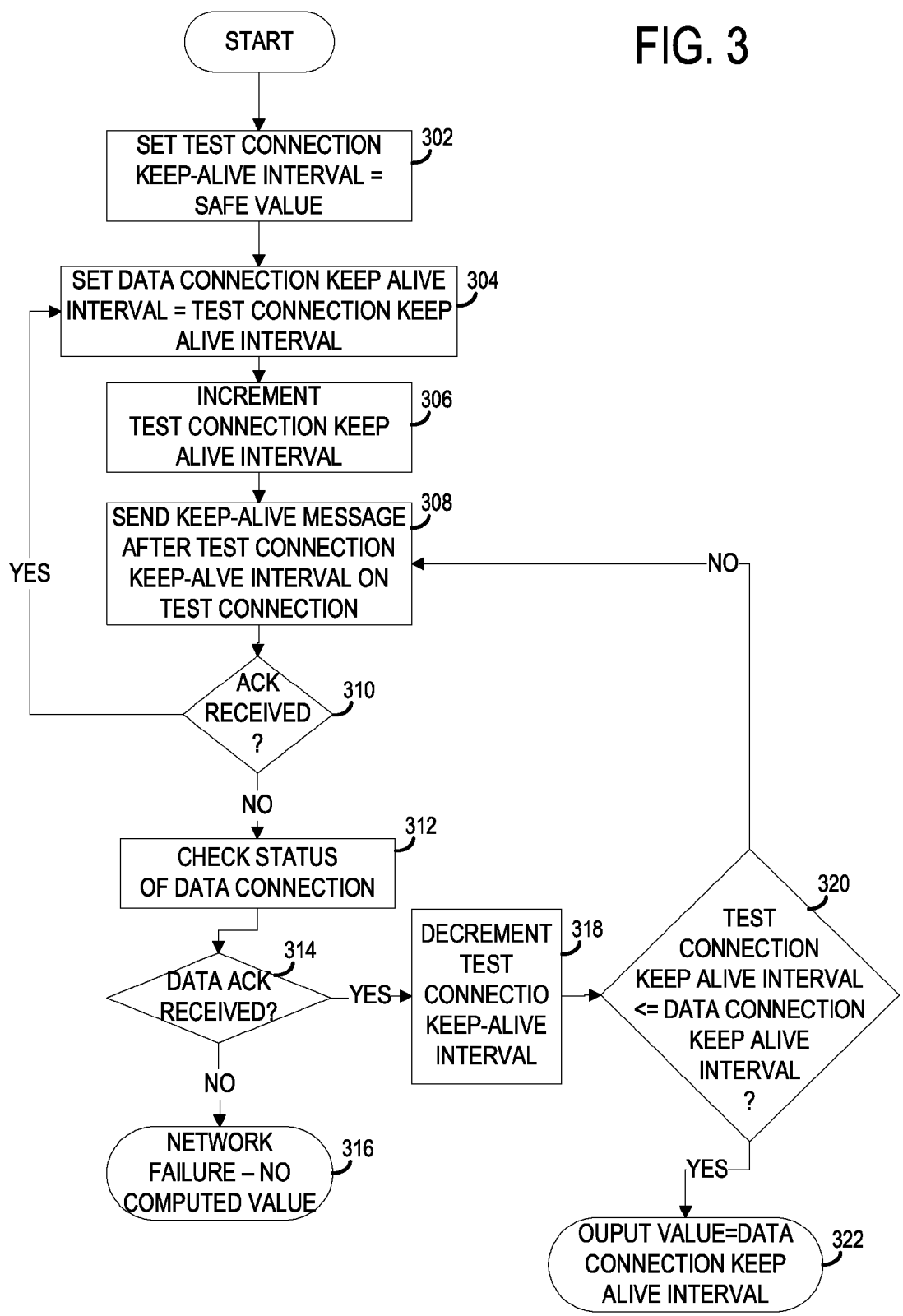
FIG. 3 illustrates a flowchart of one example method of implementing a step of determining an efficient keep-alive interval of the method of FIG. 2.

FIG. 3 illustrates example details regarding how the step of determining an efficient keep-alive interval at 210 may be accomplished. As shown at 302, determining may include setting a test connection keep-alive interval to the predetermined safe value. As shown at 304, the method may include setting a data connection keep-alive interval to a current value of the test connection keep-alive interval. At 306, the method may include incrementing the test connection keep-alive interval by a predetermined increment value.

At 308, the method may further include sending a keep-alive message from the client to the server, at the incremented test connection keep-alive interval, over the test connection. As illustrated at 310, the method may include determining whether an acknowledgment to the keep-alive message sent at 308 is received from the server via the test connection. If YES at 310, then the current test keep-alive interval is deemed to be safe, and the method loops back to 304, to set the data connection keep-alive interval to the current test connection keep-alive interval value, increment the test connection keep-alive value, and send another keep-alive message on the test connection at 304-308.

The method loops in this manner on one or more passes through the control loop illustrated at steps 304-310 until at 310 it is determined that no acknowledgement is received on the test connection in response to a keep-alive message sent at 308. If no acknowledgement is received at 310, the method proceeds to 312, where the method includes checking the status of the data connection. At 314, to check the status of the data connection, the method includes determining whether an acknowledgement has been received on the data connection, for example, during a concurrent time interval.

At 316, if it is determined that no acknowledgment was received on the data connection, then the method may include returning or outputting a message indicating that no efficient keep-alive value was computed due to a network failure.

On the other hand, at 318, if it is determined that an acknowledgement from the server was received on the data connection, for example, during a concurrent time interval, then the method includes decrementing the test connection keep-alive interval by a decrement value. The decrement value may be, for example, a mid-point between a current test connection keep-alive interval and the data connection keep-alive interval, which it will be appreciated is a previous value of the test connection keep-alive interval on a most recent pass through the decrementing step at 318.

At 320, the method may include determining if the test connection keep-alive interval is less than or equal to the data connection keep-alive interval. If it is determined that the test connection keep-alive interval is not less than or equal to the data connection keep-alive interval, then the method loops back to step 308, where another keep-alive message is sent on the test connection, for evaluation as to whether an acknowledgement is received from the server, and subsequent decrementing (or incrementing) of the test connection keep-alive interval.

If it is determined at 320 that the test connection keep-alive interval is less than or equal to the data connection keep-alive interval, then the method proceeds to 322, and includes returning or outputting an output value indicating the current value of the data connection keep-alive value as the efficient keep-alive value computed by step 210 in FIG. 2. It will be appreciated that although the data connection keep-alive value is indicated at 214 in FIG. 2 as being set to the efficient keep-alive interval following the determining step at 210, in the illustrated embodiment of FIG. 3 the step of 214 of FIG. 2 occurs during the final pass through step 304 of FIG. 3.

In one example implementation of the method illustrated in FIG. 3, it will be appreciated that steps 302-306 and 318 may be implemented by the adjustment module 24, steps 308, 316 and 322 may be implemented by the communication module 23, and steps 310-314 and 320 may be implemented by the determination module 25.

By incrementing and decrementing the keep-alive value on successive passes through the control loop just described, it will be appreciated that the keep-alive interval applied to the data connection will approach the networking device time-out value without exceeding it, thereby achieving an a stable and efficient operation of the data connection that minimizes contacts between the client and server, and conserves communication bandwidth and power, while at the same time avoiding a forced connection time-out by the networking device. This process is further illustrated in FIG. 5, discussed below.

It will be appreciated that in some embodiments of the method described above, the networking device may be one or more of a network address translation device, firewall, load balancer, or other suitable networking device, and the client may be one or more of a mobile computing device, portable data assistant, desktop computing device, laptop computing device, medial player device, mobile telephone, or other suitable computing device. In one specific embodiment, the client is a mobile telephone and the networking device is a network address translation device that functions as an access point in a mobile telephone network.

In some embodiments, it will be appreciated that the server may be configured to use a test group of clients to determine a keep-alive interval, in order to minimize the risk that connection particularities of one client would unduly affect the keep-alive intervals communicated by the server to other clients. Thus, the method may further include at the server, selecting a test group from among the plurality of clients, and receiving an efficient keep-alive interval from each client in the test group. If a statistical variance between the efficient keep-alive intervals determined for the clients in the test group is below a threshold value, then the method may include computing an aggregate efficient keep-alive interval based on the test group, and storing the aggregate efficient keep-alive interval at the server for use with other client devices connected to the server via the networking device. If the variance is not below a threshold value, outlying keep-alive values may be thrown out, or a new test group selected, until a variance below the threshold value is found.

By implementation of the method described above, a reliable and efficient keep-alive interval may be determined on a client and subsequently distributed to a plurality of clients connected to the same or a related networking device via a server, avoiding repeatedly calculating a keep-alive interval for each client. This can reduce bandwidth use and power consumption, particularly for mobile devices that must transmit a signal wirelessly to a remote receiver in order to send each keep-alive message. When implemented across large networks, the method may result in substantial power and bandwidth savings in the aggregate, compared with calculating an efficient keep-alive interval for each device on the network. Networking data connection stability is also promoted since the efficient keep-alive interval is computed using a test connection separate from the data connection. The value of the efficient keep-alive interval that is applied to the data connection may substantially approach the time-out value of the networking device, but does not exceed it and cause networking interruption, as is illustrated in FIG. 4.

FIG. 4 illustrates a graph of example keep-alive intervals for a data connection and a test connection, which have been determined according to the methods of FIGS. 2-3. As shown, the magnitudes of the keep-alive intervals (KA) are indicated on the y-axis and time is on the x-axis. The time-out value of the networking device is delineated via line 501. Initially, a test connection keep-alive interval, delineated via line 502, may be set at $KA_1$ (a safe value known to be below the networking device connection time out value 501) and a data connection keep-alive interval, delineated via line 504, may be also be set at $KA_1$, as discussed above in relation to step 302 and 304 of FIG. 3. As the method proceeds, in each pass through step 306 of FIG. 3, the test connection keep-alive interval is incremented, as is illustrated by the stair-step climbing pattern of the line 502 at t0, t1, t2. At each pass through step 304 of FIG. 3, the data connection keep-alive interval is also incremented by the method of FIG. 3, in a manner that lags the test keep-alive interval, as shown at line 504.

Once the test keep-alive interval exceeds the networking device time-out value, no acknowledgement is sent from the server to the client, causing the client to decrement the test keep-alive interval, as indicated at t4, but not the data connection keep-alive interval. If the decremented test connection keep-alive interval is less than or equal to the data connection keep-alive interval, as determined at 320 in FIG. 3, then the method determines that it has found the efficient keep-alive value, and outputs the current value for the data connection keep-alive interval as the efficient keep-alive interval.

As described above, the above described systems and methods allow an efficient and reliable keep-alive interval to be established for a client on a network, which approaches but does not exceed the time-out value of a networking device. The efficient keep-alive interval may then be distributed to a plurality of additional clients on the network, decreasing the network processing power, client battery use, etc. Therefore, the network operating costs and energy consumption may be significantly reduced in the aggregate.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for use in communication between a client and a server, via a networking device, comprising:
    sending a request to establish a data connection from the client to the server via the networking device;
    setting a data connection keep-alive interval for the data connection to a predetermined safe value;
    sending a request to establish a test connection between the client and the server;
    determining an efficient keep-alive interval for communication between the client and server via the networking device, by:
        setting a test connection keep-alive interval to the predetermined safe value;
        on each of one or more passes through a control loop, setting the data connection keep-alive interval to a current value for the test connection keep-alive interval;
        incrementing the test connection keep-alive interval by a predetermined increment value;
        sending a keep-alive message from the client to the server, at the incremented test connection keep-alive interval, over the test connection; and
        if it is determined that an acknowledgement is received to the keep-alive message on the test connection, then setting the data connection keep-alive interval to the test connection keep-alive interval value, the set data connection keep-alive interval being the efficient keep-alive interval;
        if it is determined that no acknowledgement is received on the test connection in response to the keep-alive message on the test connection, then checking a status of the data connection by determining whether an acknowledgement has been received on the data connection during a concurrent time interval; and
        if it is determined that no acknowledgment was received on the data connection during the concurrent time interval, then outputting a message indicating that no efficient keep-alive value was computed due to a network failure; and
    if an efficient keep alive interval was determined, then uploading the efficient keep-alive interval from the client to the server in an efficient keep-alive interval notification message, for communication to additional clients connected to the server.

2. The method of claim 1, wherein the efficient keep-alive interval notification message includes network device identifying data including one or more of APN and DNS suffix, as well as the determined efficient keep-alive interval.

3. The method of claim 1, wherein the client is one of a plurality of clients connected to the server via the networking device, the method further comprising:
    applying the efficient keep-alive interval to connections between additional clients included in the plurality of clients and the server via the networking device.

4. The method of claim 3, wherein applying the efficient keep-alive interval includes:
    from each of the other of the plurality of clients, sending a request to initiate a respective data connection with the server, and an associated networking device notification message to identify to the server the networking device via which the client is connected to the server;
    in response to a server determination that the efficient keep-alive interval for the connections to clients via the networking device has been uploaded and stored at the server, downloading the efficient keep-alive interval to each of the additional clients.

5. The method of claim 4, wherein the networking device notification message includes APN and DNS suffix, and the server determination is based on the APN and DNS suffix and on a client subnet detectable from the data connection between the client and server.

6. The method of claim 4, further comprising:
    sending an error message from at least one of the additional clients to the server, indicating that the efficient keep-alive interval downloaded from the server is resulting in a connection time-out on a data connection between the corresponding client and the server.

7. The method of claim 6, after sending the error message from the corresponding client,
sending a request for an updated efficient keep-alive interval to the server from the corresponding client; and
receiving the updated efficient keep-alive interval at the corresponding client, which has been calculated at the server in response to the error message from the corresponding client.

8. The method of claim 1, wherein using the data connection to determine that there is no network failure includes:
determining that an acknowledgement was received on the data connection during the concurrent time interval, and, in response, decrementing the test connection keep-alive interval by a decrement value.

9. The method of claim 8, further comprising:
determining if the test connection keep-alive interval is less than or equal to the data connection keep-alive interval; and
if it is determined that the test connection keep-alive interval is less than or equal to the data connection keep-alive interval, then outputting an output value indicating a current value of the data connection keep-alive interval as the efficient keep-alive interval.

10. The method of claim 1, wherein the client is configured to reestablish the test connection and re-determine the efficient keep-alive interval using the test connection, upon detecting a failure in the data connection at the efficient keep-alive interval.

11. The method of claim 1, wherein the networking device is one or more of a network address translation device, firewall, and load balancer.

12. The method of claim 1, wherein the client is one or more of a mobile computing device, portable data assistant, desktop computing device, laptop computing device, media player device, and mobile telephone.

13. The method of claim 1, wherein the client is a mobile telephone and the networking device is a network address translation device that functions as an access point in a mobile telephone network.

14. A method for use in communication between at least one of a plurality of clients and a server, via a networking device, comprising:
sending a request to establish a data connection from the client to the server via the networking device;
setting a data connection keep-alive interval for the data connection to a predetermined safe value;
sending a request to establish a test connection between the client and the server;
determining an efficient keep-alive interval for communication between the client and server via the networking device, using the test connection, by
setting the test connection keep-alive interval to the predetermined safe value;
on each of one or more passes through a control loop,
setting the data connection keep-alive interval to a current value for the test connection keep-alive interval;
incrementing the test connection keep-alive interval by a predetermined increment value;
sending a keep-alive message from the client to the server, at the incremented test connection keep-alive interval, over the test connection;
if it is determined that an acknowledgement is received to the keep-alive message on the test connection, then setting the data connection keep-alive interval to the test connection keep-alive interval value;
if it is determined that no acknowledgement is received on the test connection in response to the keep-alive message on the test connection, then checking a status of the data connection by determining whether an acknowledgement has been received on the data connection during a concurrent time interval;
if it is determined that an acknowledgement was received on the data connection during the concurrent time interval, then decrementing the test connection keep-alive interval by a decrement value;
determining if the test connection keep-alive interval is less than or equal to the data connection keep-alive interval; and
if it is determined that the test connection keep-alive interval is less than or equal to the data connection keep-alive interval, then outputting an output value indicating a current value of the data connection keep-alive value as the efficient keep-alive value; and
uploading the efficient keep-alive interval from the client to the server in an efficient keep-alive interval notification message.

* * * * *